United States Patent Office 3,330,624
Patented July 11, 1967

3,330,624
PREPARATION OF PYROSULFURYL FLUORIDE AND BY-PRODUCTS
Richard F. Sweeney and Henry R. Nychka, both of Randolph Township, Morris County, N.J., assignors to Allied Chemical Corporation, New York, N.Y., a corporation of New York
No Drawing. Filed June 5, 1964, Ser. No. 373,057
9 Claims. (Cl. 23—203)

This invention relates to the preparation of pyrosulfuryl fluoride and various useful by-products. More specifically, this invention relates to the production of pyrosulfuryl fluoride and the following by-products: 1,2-dichlorotetrafluorocyclopentenone-3; 1,2-dichlorodifluorocyclopentene - 3,5 - dione; 1,2 - dichlorohexafluorocyclohexenone-3; and a novel compound, 2,3-dichlorotetrafluorocyclohexene-1,4-dione.

Pyrosulfuryl fluoride (disulfuryl fluoride), $S_2O_5F_2$, a known compound, is useful as an intermediate in the preparation of sulfur oxyfluorides, which are intermediates in the synthesis of fluorocarbons. 1,2-dichlorotetrafluorocyclopentenone-3.

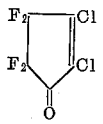

a known compound is useful as an intermediate in the preparation of insecticides, miticides, and herbicides as disclosed in the copending applications of Gilbert and Veldhuis, Ser. Nos. 373,036 and 373,056, both filed June 5, 1964. 1,2-dichlorodifluorocyclopentene-3,5 dione.

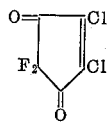

is useful as a nematocide as disclosed in the copending application of Sweeney and Cunningham, Ser. No. 375,955, filed June 17, 1964, now abandoned. 1,2-dichlorohexafluorocyclohexenone-3

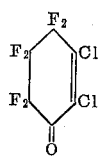

is useful as an intermediate in the preparation of insecticides, miticides, and herbicides as disclosed in the copending applications of Gilbert and Veldhuis, above referred to. The novel compound, 2,3-dichlorotetrafluorocyclohexene-1,4 dione,

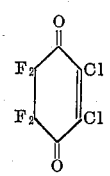

is useful as an insecticidal fumigant. Such utility will be more fully set forth infra.

Pyrosulfuryl fluoride has been prepared by the reaction of antimony pentafluoride with $SO_3$. This process has the disadvantage of forming, in addition to anhydrous oxyfluorides, by-products which are of little commercial value. Pyrosulfuryl fluoride has also been prepared by the reaction of other metal fluorides with $SO_3$ under pressure, which has the disadvantage of requiring expensive autoclaves and developing serious corrosion problems.

One object of this invention is to provide a new and more effective process for the production of pyrosulfuryl fluoride. A further object is to provide a new process for the preparation of pyrosulfuryl fluoride with by-products which are commercially useful. Still another object is to provide a new chemical compound, 2,3-dichlorotetrafluorocyclohexene-1,4 dione, and the provision thereof for application as an insecticidal fumigant. Other objects and advantages of the invention will be apparent hereinafter.

In accordance with the above objects, the invention of this application is directed to a process wherein an initial reactant, selected from the group consisting of 1,2-dichlorohexafluorocyclopentene-1, which has the following formula:

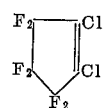

and 1,2-dichloroctafluorocyclohexene-1, which has the following formula:

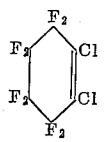

is reacted, under substantially anhydrous conditions, with $SO_3$, in the presence of a small amount of a pentavalent antimony compound which acts as a catalyst to convert the initial reactants to pyrosulfuryl fluoride and 1,2-dichlorotetrafluorocyclopentenone - 3 and 1,2 - dichlorodifluorocyclopentene-3,5-dione or 1,2-dichlorohexafluorocyclohexenone-3 and 2,3-dichlorotetrafluorocyclohexene-1,4-dione.

The reactions are illustrated by the following general equations:

1. (A)

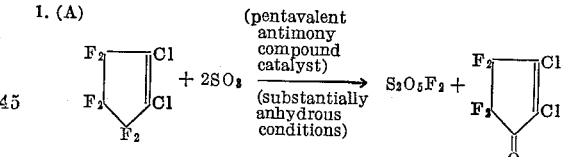

(B)

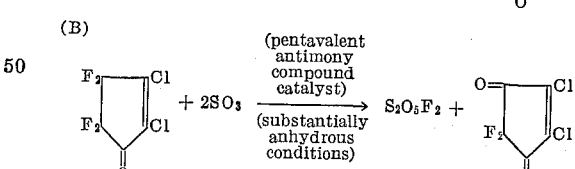

2. (A)

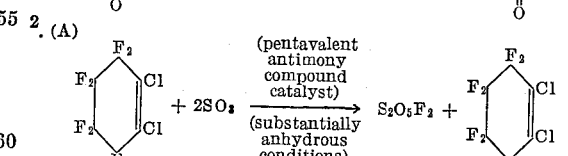

(B)

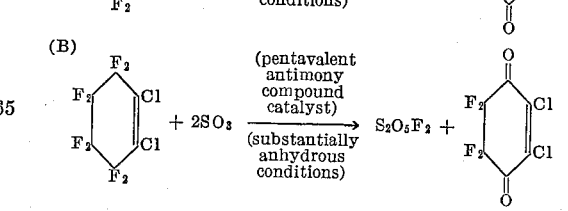

The initial olefin reactant is selected in accordance with the desired by-products; i.e., where the production of pyrosulfuryl fluoride; 1,2 - dichlorotetrafluorocyclopentenone-3; and 1,2-dichlorodifluorocyclopentene-3,5-dione the objective, 1,2-dichlorohexafluorocyclopentene-1 is selected, and where pyrosulfuryl fluoride; 1,2-dichlorohexafluorocyclohexenone-3; and 2,3-dichlorotetrafluorocyclohexene-1,4-dione are the objective, 1,2-dichlorooctafluorocyclohexene-1 is selected. A suitable reaction vessel can be a glass-lined reaction chamber and is usually, but not necessarily, fitted with a reflux condenser and external heating means. Anhydrous sulfur trioxide, in liquid or solid form, is admixed with the initial olefin in the reaction chamber. The molar ratio of $SO_3$ to olefin can be stoichiometric or in a range from a ratio of about 0.1 mole of $SO_3$ to 1 mole of olefin to a ratio of 20 moles of $SO_3$ to 1 mole of olefin. The preferred range of ratios is 2 moles of $SO_3$ to 1 mole of olefin to 3 moles of $SO_3$ to 1 mole of olefin. Molar ratios, in the vicinity of 2:1, yield higher proportions of pyrosulfuryl fluoride and monoketone and higher concentrations of $SO_3$, e.g., 3:1, give higher proportions of diketone. Where high concentrations of diketone are desired substantially higher concentrations of $SO_3$ should be used.

The catalyst, a pentavalent antimony compound, is also added to the mixture in the reaction vessel before the reaction is initiated. The amount of pentavalent antimony compound catalyst, in percentage by weight based on the weight of $SO_3$, can be from about 0.5% to about 25%. The preferred range is from 2% to 10%. Examples of pentavalent antimony compounds are antimony pentachloride, antimony pentafluoride, antimony pentabromide, and antimony pentaiodide. The reactants can be mixed at room temperature with some conversion to pyrosulfuryl fluoride; however, to obtain reasonable conversions, it is necessary to heat the reaction mixture. The reaction vessel can be heated to a temperature in the range of about 30° C. to about 50° C. If the reaction is conducted under reflux, which is preferable, the reaction vessel is heated to reflux temperature. At the start of reflux, the temperature of the reaction mixture generally is about 44–46° C., the boiling point of $SO_3$. As the reaction proceeds, the temperature of the reaction mixture rises and eventually becomes constant. The reaction is considered to be complete at this point. The maximum temperature of the reaction mixture can vary between 50° C. and 100° C. depending on the ratio of $SO_3$ to olefin. When the molar ratio of $SO_3$ to olefin is between 2:1 and 3:1, the maximum temperature reached by the reaction mixture under reflux is usually between about 75°–95° C. Although a substantial amount of product has formed after one hour of reflux, and the reaction is considered nearly complete after two hours of reflux, the reaction is generally continued for 15 to 18 hours to obtain maximum conversion. The reaction pressure can be atmospheric, super-atmospheric, or sub-atmospheric; however, the preferred pressure is atmospheric, which is the most practical. An outstanding advantage of preparing pyrosulfuryl fluoride by this process is that it can be conducted under atmospheric pressure, which is more convenient than the pressure processes that have been used in the past for preparing this compound.

The products of the reaction can be conveniently separated by fractional distillation.

Water has been found to be detrimental to the process when used during the reaction and recovery of the products; however, small amounts of water, no greater than 4% by weight of the reactants can be tolerated. For recovery of the products, there should be substantially no hydrolysis of the products of the reaction, since pyrosulfuryl fluoride is decomposed and the water interferes with the recovery of the 1,2-dichlorodifluorocyclopentene-3,5-dione and the 2,3-dichlorotetrafluorocyclohexene-1,4-dione.

As indicated above, the novel compound, 2,3-dichlorotetrafluorocyclohexene-1,4-dione, finds valuable application as an active insecticidal fumigant. The fumigant is used in combatting infestation in flour and grain contained in storage bins, grain elevators, and the like and in combatting plant insects.

The preferred mode of using the compound of this invention is to enclose the area to be fumigated and expose such area to the compound, which vaporizes and permeates the atmosphere. Since the vapor is heavier than air, it tends to sink to the bottom of the bin or elevator, penetrating the flour or grain as it settles. The compound may be used by itself and placed in an open container or on an absorbent in the designated area. In the tests shown infra, 0.1 cc. of compound per gallon jar, or 25.43 fluid ounces of compound per 1,000 cubic feet of space, were used. The preferred range is about 15 fluid ounces of compound per 1,000 cubic feet to about 30 fluid ounces of compound per 1,000 cubic feet, but the upper limit is not restricted except by the bounds of practicality.

The following examples illustrate the present invention. Parts and percentages are by weight.

EXAMPLE I

A 250 ml. flask was charged with 50 parts of 1,2-dichlorohexafluorocyclopentene-1, 35.2 parts of $SO_3$ and 2.4 parts of $SbF_5$. The mixture was refluxed for two hours and 25 minutes. The temperature of the pot contents measured in the liquid phase rose from 44° C. to 85° C. The product mixture was distilled and the following compounds were obtained:

(a) Unreacted 1,2 - dichlorohexafluorocyclopentene-1, 13 parts (B.P. 90–92°C.);
(b) Pyrosulfuryl fluoride, 22.3 parts (B.P. 51° C.);
(c) 1,2-dichlorotetrafluorocyclopentenone-3, 12.8 parts (B.P. 127–128° C.);
(d) 1,2-dichlorodifluorocyclopentene - 3,5 - dione, 3.7 parts (B.P. 178–179° C.).

Calcd. for $C_5Cl_2F_2O_2$: Cl, 35.3 percent; F, 18.9 percent. Found: Cl, 35.4 percent; F, 18.6 percent.

The nuclear magnetic resonance spectra of this compound was compatible with the assigned structure.

EXAMPLE II

A 300 ml. flask was charged with 267.8 parts of 1,2-dichlorooctafluorocyclohexene-1, 151 parts of $SO_3$, and 10 parts of antimony pentafluoride. The mixture was heated to reflux temperature for 20 hours. The temperature of the pot contents measured in the liquid phase rose from 54° C. to 85° C. The product mixture was distilled and the following compounds were obtained:

(a) Pyrosulfuryl fluoride, 90.0 parts (B.P. 44–70° C.);
(b) Unreacted 1,2 - dichlorooctafluorocyclohexene - 1, 127.8 parts (B.P. 110–115° C.);
(c) 1,2 - dichlorohexafluorocyclohexenone - 3, 100.5 parts (B.P. 135–138° C.); and
(d) 2,3 - dichlorotetrafluorocyclohexene - 1,4 - dione, 23.0 parts (B.P. 163–165° C.).

The analytical data for 2,3-dichlorotetrafluorocyclohexene-1,4-dione was as follows:

Calcd. for $C_6Cl_2O_2F_4$: Cl, 28.3 percent; F, 30.3 percent. Found: Cl 27.9 percent; F, 29.8 percent.

The nuclear magnetic resonance spectrum of this compound was compatible with the assigned structure.

EXAMPLE III

A 1-liter, 2-neck flask equipped with a stirrer, reflux condenser, and thermometer was charged with 605 parts of 1,2-dichlorooctafluorocyclohexene-1, 342 parts of $SO_3$, and 20 parts of antimony pentafluoride. The reactants were mixed at room temperature and refluxed for 17 hours. The product mixture was distilled to give:

(a) Pyrosulfuryl fluoride, 352 parts;
(b) Unreacted 1,2 - dichlorooctafluorocyclohexene - 1, 121 parts;
(c) 1,2 - dichlorohexafluorocyclohexenone - 3, 317 parts; and
(d) 2,3 - dichlorotetrafluorocyclohexene - 1,4 - dione, 77.8 parts.

EXAMPLE IV

To a mixture of 295 parts of 1,2-dichlorooctafluorocyclohexene-1 and 240 parts of sulfur trioxide, 20 parts of antimony pentafluoride were added. The mixture was heated to 85° C. in the course of three hours and then allowed to stand for three days at room temperature. Distillation of the reaction mixture gave:

(a) Pyrosulfuryl fluoride, 193 parts;
(b) 1,2 - dichlorohexafluorocyclohexenone - 3, 144 parts; and
(c) 2,3 - dichlorotetrafluoro - 2 - cyclohexene - 1,4-dione, 60 parts.

EXAMPLE V

A 1-liter flask was charged with 616.7 parts of 1,2-dichlorooctafluorocyclohexene-1, 344 parts of $SO_3$ and 20 parts of $SbCl_5$. The mixture was heated to reflux temperature for 17½ hours. The temperature of the reaction mixture measured in the liquid phase rose from 44° C. to 87° C. The product mixture was distilled and the following compounds were obtained:

(a) Pyrosulfuryl fluoride, 411.9 parts;
(b) Unreacted 1,2 - dichlorooctafluorocyclohexene-1, 78.6 parts;
(c) 1,2 - dichlorohexafluorocyclohexenone - 3, 299.5 parts; and
(d) 2,3 - dichlorotetrafluorocyclohexene - 1,4 - dione, 93.9 parts.

The novel compound, 2,3 - dichlorotetrafluorocyclohexene-1,4-dione, was tested for its insecticidal fumigant properties as follows:

TABLE I

| Insect | Number of Pupae | 7 days | |
|---|---|---|---|
| | | Number Emerged | Percent Control |
| 1. House Fly Pupae | 25 | None | 100 |
| | | Days after exposure | |
| | | 0 | 1 | 3 |
| | | Percent Mortality | |
| 2. Lesser Mealworm | 80 | 100 | 100 | 100 |
| 3. Confused Flour Beetle | 80 | 100 | 100 | 100 |

The method used for the fumigant test in Table I is as follows:

Test insects are placed in 1.5″ diameter salve tins with perforated lids. A small amount of appropriate food (grain, flour, ground dog food, etc.) is placed in each tin. Dosages of 0.1 cc. are placed on a cellucotton wad, or in a small container, in a gallon Mason jar. As soon as the insect containers and the compound are introduced, the jar is sealed. After exposure, mortality counts are made on the days noted in Table I above. The mortality count made 0 days after exposure includes the period up to 24 hours immediately after exposure.

Since various changes and modifications may be made in the invention without departing from the spirit thereof, the invention is to be taken as limited only by the scope of the appended claims.

We claim:

1. A method for the preparation of pyrosulfuryl fluoride comprising admixing, under substantially anhydrous conditions, a compound selected from the group consisting of 1,2-dichlorohexafluorocyclopentene-1 and 1,2-dichlorooctafluorocyclohexene-1 with $SO_3$ in the presence of a pentavalent antimony halide catalyst to effect reaction between said compound and $SO_3$ to produce pyrosulfuryl fluoride.

2. A method for the preparation of pyrosulfuryl fluoride comprising admixture, under substantially anhydrous conditions, 1,2 - dichlorohexafluorocyclopentene - 1 with $SO_3$ in the presence of a pentavalent antimony halide catalyst to effect reaction between said compound and $SO_3$ to produce pyrosulfuryl fluoride.

3. A method for the preparation of pyrosulfuryl fluoride comprising admixing, under substantially anhydrous conditions, 1,2 - dichlorooctafluorocyclohexene - 1 with $SO_3$ in the presence of a pentavalent antimony halide catalyst to effect reaction between said compound and $SO_3$ to produce pyrosulfuryl fluoride.

4. A method for the preparation of pyrosulfuryl fluoride and 1,2 - dichlorotetrafluorocyclopentenone - 3 comprising admixing, under substantially anhydrous conditions, 1,2 - dichlorohexafluorocyclopentene - 1 with $SO_3$ in the presence of a pentavalent antimony halide catalyst and recovering pyrosulfuryl fluoride and 1,2-dichlorotetrafluorocyclopentenone-3, under substantially anhydrous conditions.

5. A method for the preparation of pyrosulfuryl fluoride and 1,2 - dichlorohexafluorocyclohexenone - 3 comprising admixing, under substantially anhydrous conditions, 1,2 - dichlorooctafluorocyclohexene - 1 with $SO_3$ in the presence of a pentavalent antimony halide catalyst and recovering pyrosulfuryl fluoride and 1,2-dichlorohexafluorocyclohexenone-3, under substantially anhydrous conditions.

6. A method for the preparation of pyrosulfuryl fluoride; 1,2 - dichlorotetrafluorocyclopentenone - 3; and 1,2-dichlorodifluorocyclopentene - 3,5 - dione comprising admixing, under substantially anhydrous conditions, 1,2-dichlorohexafluorocyclopentene - 1 with $SO_3$ in the presence of a pentavalent antimony halide catalyst and recovering pyrosulfuryl fluoride; 1,2 - dichlorotetrafluorocyclopentenone-3; and 1,2-dichlorodifluorocyclopentene-3,5-dione, under substantially anhydrous conditions.

7. A method for the preparation of pyrosulfuryl fluoride; 1,2 - dichlorohexafluorocyclohexenone - 3; and 2,3-dichlorotetrafluorocyclohexene - 1,4 - dione comprising admixing, under substantially anhydrous conditions, 1,2-dichlorooctafluorocyclohexene - 1 with $SO_3$ in the presence of a pentavalent antimony halide catalyst and recovering pyrosulfuryl fluoride; 1,2 - dichlorohexafluorocyclohexenone-3; and 2,3-dichlorotetrafluorocyclohexene-1,4-dione, under substantial anhydrous conditions.

8. A method for the preparation of pyrosulfuryl fluoride comprising admixing, under substantially anhydrous conditions, a compound selected from the group consisting of 1,2-dichlorohexafluorocyclopentene-1 and 1,2-dichlorooctafluorocyclohexene-1 with $SO_3$, in a range from a ratio of about 0.1 mole of $SO_3$ to 1 mole of olefin to a ratio of 20 moles of $SO_3$ to 1 mole of olefin, in the presence of about 0.5% to about 25%, by weight based on the weight of $SO_3$, of a pentavalent antimony halide catalyst, the reaction taking place at a temperature range from 25° to 100° C. and the reaction time being from 5 minutes to 24 hours.

9. A compound having the following formula:

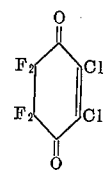

(References on following page)

References Cited

UNITED STATES PATENTS

| | | | |
|---|---|---|---|
| Re. 24,435 | 2/1958 | Filbert et al. | 260—586 |
| 2,584,139 | 2/1952 | Lidov | 260—586 |
| 2,955,979 | 10/1960 | Van Strien | 167—30 |
| 3,041,244 | 6/1962 | Feit | 167—88 |
| 3,096,237 | 7/1963 | Kuhle | 167—30 |
| 3,153,066 | 10/1964 | Werber | 260—586 |

OTHER REFERENCES

Berichte 21, p. 2723 (1888).
Chemical Abstracts 58: 6817b (1963).

OSCAR R. VERTIZ, *Primary Examiner.*

JULIAN S. LEVITT, *Examiner.*

J. D. GOLDBERG, H. S. MILLER, *Assistant Examiners.*